(12) United States Patent
Caveney et al.

(10) Patent No.: US 7,959,460 B2
(45) Date of Patent: Jun. 14, 2011

(54) METHOD AND APPARATUS FOR PATCH PANEL PATCH CORD DOCUMENTATION AND REVISION

(75) Inventors: Jack E. Caveney, Hinsdale, IL (US); Ronald A. Nordin, Naperville, IL (US); Brian D. Leshin, Mokena, IL (US); Satish I. Patel, Roselle, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 12/467,862

(22) Filed: May 18, 2009

(65) Prior Publication Data

US 2009/0227140 A1 Sep. 10, 2009

Related U.S. Application Data

(63) Continuation of application No. 11/969,353, filed on Jan. 4, 2008, now Pat. No. 7,534,137, which is a continuation of application No. 11/673,927, filed on Feb. 12, 2007, now Pat. No. 7,488,206.

(60) Provisional application No. 60/773,264, filed on Feb. 14, 2006.

(51) Int. Cl.
*H01R 13/60* (2006.01)
(52) U.S. Cl. .................................. 439/540.1
(58) Field of Classification Search ............... 439/540.1, 439/210, 701; 174/48
See application file for complete search history.

(56) References Cited

U.S. PATENT DOCUMENTS

| | | | |
|---|---|---|---|
| 6,267,611 B1 * | 7/2001 | Wilson et al. | 439/215 |
| 6,431,765 B1 * | 8/2002 | Chen et al. | 385/92 |
| 6,461,200 B1 * | 10/2002 | Shi et al. | 439/676 |
| 6,882,140 B2 * | 4/2005 | Green et al. | 324/158.1 |
| 7,044,779 B1 * | 5/2006 | Liu | 439/541.5 |
| 7,110,534 B1 * | 9/2006 | Mullaney et al. | 379/428.01 |
| 2002/0069277 A1 | 6/2002 | Caveney | |

FOREIGN PATENT DOCUMENTS

| | | |
|---|---|---|
| EP | 1734692 A1 | 12/2006 |
| GB | 2406447 A | 3/2005 |
| WO | 2006052686 A1 | 5/2006 |

* cited by examiner

*Primary Examiner* — Jean F Duverne
(74) *Attorney, Agent, or Firm* — Robert A. McCann; Christopher S. Clancy; Christopher K. Marlow

(57) ABSTRACT

Intelligent patch panels support patch cord management in communications networks. Modular patch panels can be connected to one another for the purposes of sharing power and also for the purposes of monitoring patch cord connections and reporting the status of patch cord connections to a network management system. Each port of an intelligent patch panel may be provided with out-of-band contacts to allow for monitoring and reporting of patch cord connectivity information. According to one embodiment, out-of-band contacts send identification information regarding their associated patch panel ports along a ninth wire of a patch cord.

3 Claims, 11 Drawing Sheets

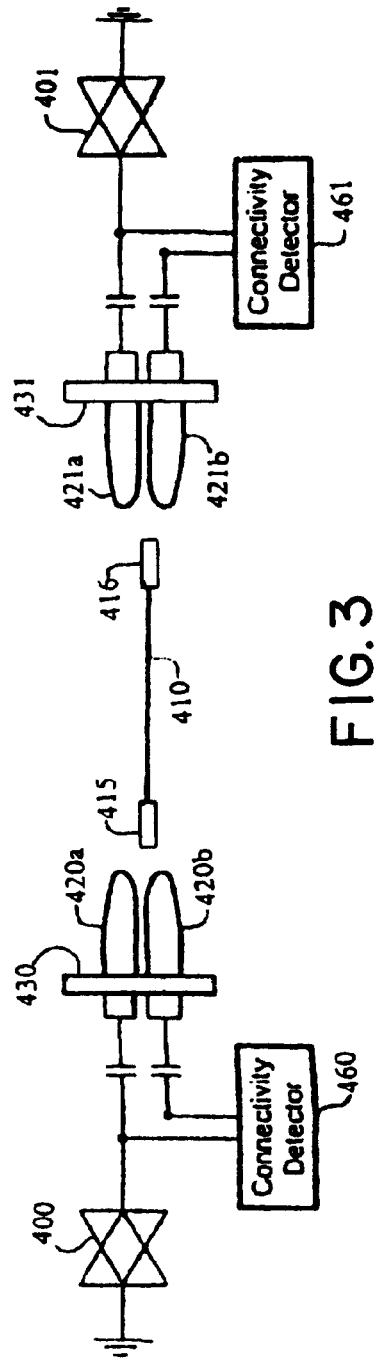
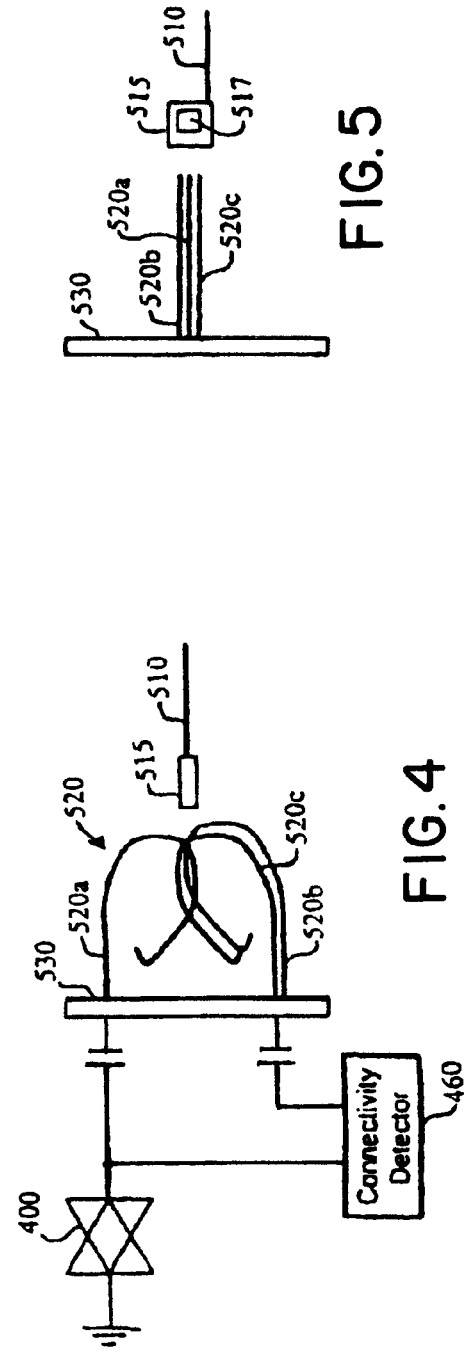
FIG. 3
FIG. 4
FIG. 5
FIG. 6

US 7,959,460 B2

METHOD AND APPARATUS FOR PATCH PANEL PATCH CORD DOCUMENTATION AND REVISION

RELATED APPLICATIONS

This application is a continuation of U.S. patent application Ser. No. 11/969,353, filed Jan. 4, 2008, now U.S. Pat. No. 7,534,137, which is a continuation of U.S. patent application Ser. No. 11/673,927, filed Feb. 12, 2007, now U.S. Pat. No. 7,488,206, which claims priority to U.S. Provisional Patent Application No. 60/773,264 filed Feb. 14, 2006. This application further incorporates by reference in their entireties U.S. patent application Ser. No. 11/265,316, filed Nov. 2, 2005; U.S. Provisional Patent Application Ser. No. 60/737,919, filed Nov. 18, 2005; U.S. patent application Ser. No. 11/462,895, filed Aug. 7, 2006; and U.S. patent application Ser. No. 11/560,112, filed Nov. 15, 2006.

FIELD OF THE INVENTION

The present invention pertains to network cable management.

BACKGROUND

Communications networks are growing in number and complexity. Monitoring network connections, including the management of patch panel connections, is an important task in network management. There is a desire for a patch panel management architecture that is reliable and scalable.

SUMMARY OF THE INVENTION

According to one embodiment of the present invention, a patch cord management system supports patch cord management in communications networks having a cross-connect configuration.

Methods and apparatuses are provided for monitoring and reporting cable connectivity such as intelligent patch panel port-level connectivity in real-time. For the intelligent patch panel system example, the approach is based on a distributed architecture that may be modularly scalable, that eliminates the need for monitoring systems that continuously scan ninth wire connections, and that eliminates the need for complex cabling between patch panels and the monitoring systems. Each intelligent patch panel is the same as every other intelligent patch panel. Connectivity information can be determined instantly and communicated via an Ethernet link to a Network Management System (NMS) upon additions, removals, or changes to connections between intelligent patch panels. Polling delays and polling-related overhead is eliminated by supporting real-time monitoring of port connectivity at the port level. The approach is controlled by a multipurpose NMS.

Embodiments of the present invention comprise a network connection documentation system which starts the documentation process when a first patch cord is installed in a port of an intelligent patch panel and notifies the NMS of any change in the patch field in real time.

BRIEF DESCRIPTION OF FIGURES

FIG. 3 is a diagram of a patch cord detection assembly according to one embodiment of the present invention;

FIGS. 4-6 are diagrams of a patch cord detection assembly according to another embodiment of the present invention;

DETAILED DESCRIPTION OF PREFERRED EMBODIMENTS

The present invention is directed to methods and systems for monitoring, documenting, and guiding patch cord changes in a patch field of a communications network.

Figure 1:
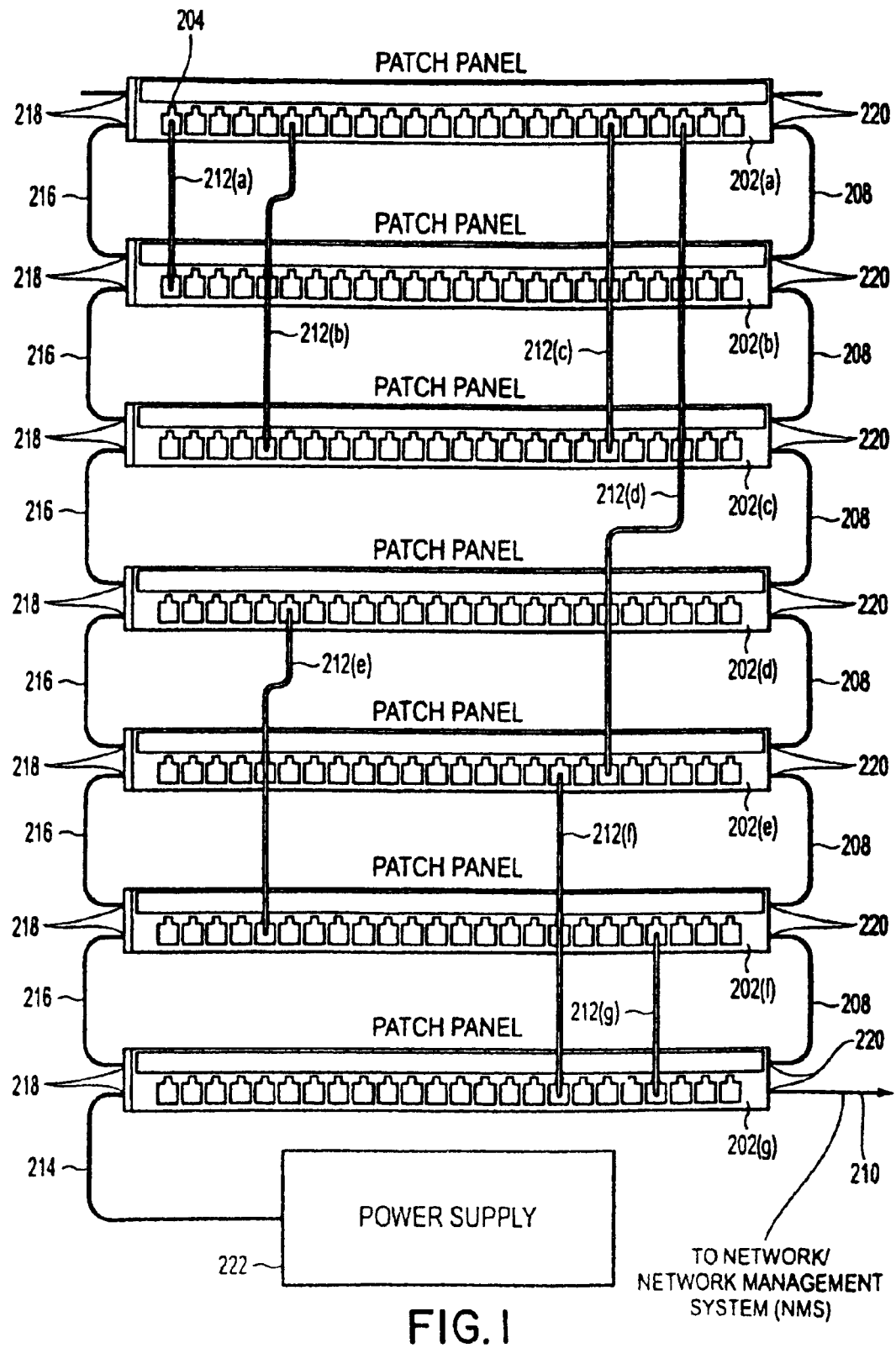
FIG. 1 is a front view of intelligent patch panels according to one embodiment of the present invention.

FIG. 1 is a schematic diagram of seven exemplary modular, intelligent patch panels 202(a-g). Each intelligent patch panel 202 is based upon a modularly scalable, distributed architecture. Each patch panel 202 may include a pair of network connection ports 220 that allow the respective patch panels to be interconnected in a daisy-chain configuration to a network connection 210 using daisy-chain network cables 208 (e.g., relatively short spans of 4-pair network cable terminated in conventional RJ-45 terminators). Network connection 210 may provide network connectivity to each patch panel in the daisy-chain and may thereby provide each patch panel in the daisy-chain with connectivity to a remote Network Management System (NMS). Further, each patch panel 202 may include a pair of power sharing ports 218 that allow the patch panels to be interconnected in a daisy-chain configuration to a single power supply 222 using daisy-chain power cables 216 (e.g., relatively short spans of DC or AC electrical power cabling with appropriate connectors).

Figure 2:
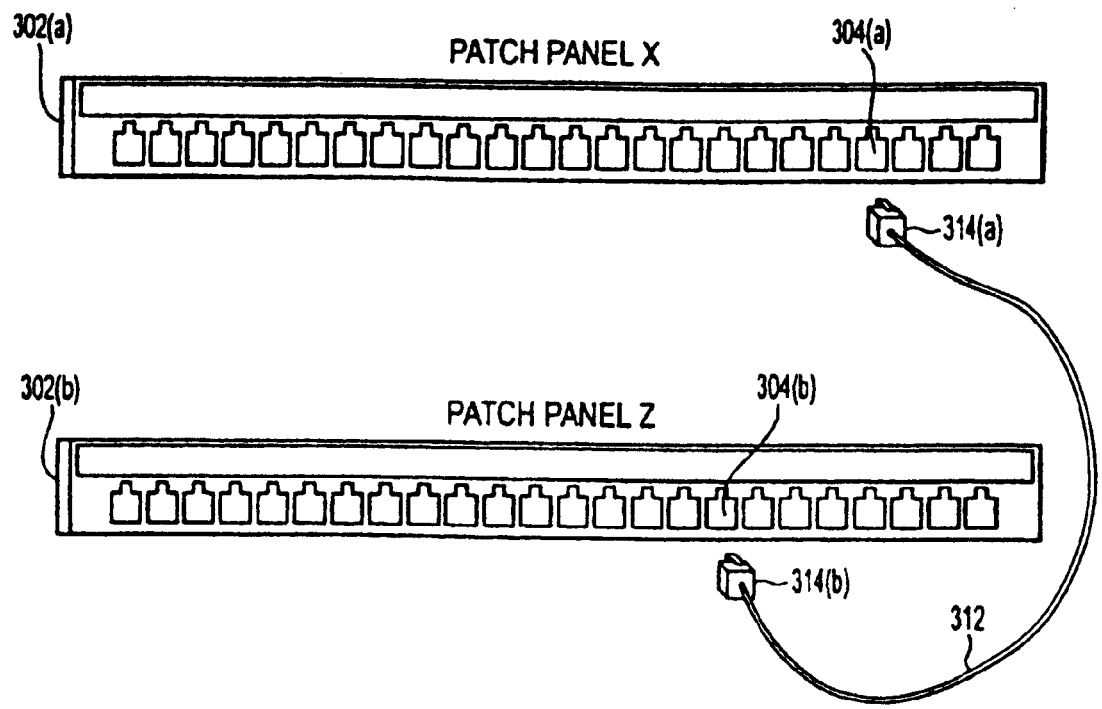
FIG. 2 is a front view of two intelligent patch panels in a connection process.

FIG. 2 is a schematic diagram depicting an exchange of out-of-band messages between an intelligent patch panel 302 (a) labeled "patch panel X" and an intelligent patch panel 302(b) labeled "patch panel Z." The ports of patch panels according to the present invention may communicate connection information between each other. For example, as shown in FIG. 2, patch panel port 304(a) associated with panel X may generate an outbound message "patch panel X/Port 21" to indicate that patch panel port 304(a) is the twenty-first port on patch panel X. As shown in FIG. 3, port 304(b) associated with patch panel Z may generate an outbound message "patch panel Z/Port 17" to indicate that patch panel port 304(b) is the seventeenth port on patch panel Z. Messages may be coordinated as further explained below to inform the NMS of any changes to patch cord connections.

Figure 7:
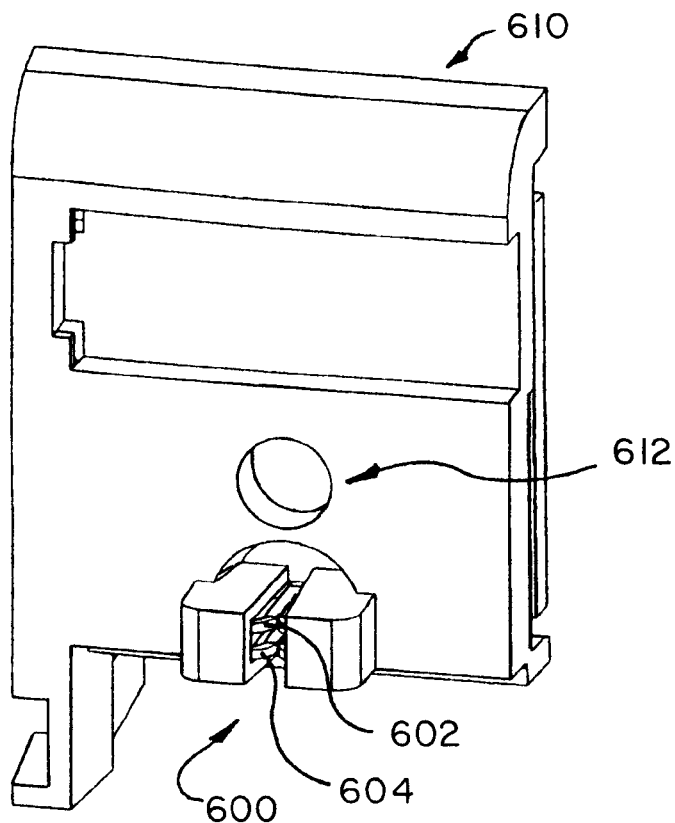
FIGS. 7-17 illustrate patch cord detection contacts according to one embodiment of the present invention.

Each patch panel port of the present invention is provided with contacts that enable intelligent patch panels according to the present invention to identify when patch cord plugs have been inserted into ports of the intelligent patch panels. FIGS. 3-17 illustrate patch panel contacts and nine-wire patch cords that may be used in certain embodiments of the present invention. Further, each patch panel port is provided with indicator lights which allow the intelligent patch panels to guide each step of the addition or removal of patch cords connected between patch panels. These indicator lights may be implemented as dual-color red and green LEDs, for example. FIG. 7 shows an example of a light pipe opening accommodating indicator lights. The use of contacts such as those shown and described below (with reference to FIGS. 3-17) enables guided addition and removal processes, instant recognition of plug insertions and removals by the intelligent patch panels, and immediate communication of plug insertions and removals by intelligent patch panels to the NMS.

Addition of a patch cord will now be described with reference to FIG. 2. In addition and removal processes according to the present invention, LEDs associated with patch panel ports are used as follows:

| | |
|---|---|
| On: | Add a plug |
| Flashing: | Remove a plug |
| Green: | Normal operation |
| Red: | An error has been made. |

In the illustrated patch cord installation process, a nine-wire patch cord 312 is to be connected between the twenty-first port 304(a) of a first intelligent patch panel 302(a) and the seventeenth port 304(b) of a second intelligent patch panel 302(b) as shown in FIG. 2. The system orders the installation and lights designated port LEDs associated with both ports 302(a) and 304(b) solid green. Next, either plug 314(a) or 314(b) may be installed into its corresponding port. For example, the plug 314(a) on one end of the patch cord 312 is installed into the port 304(a). If the plug 314(a) is plugged into one of the designated ports for the cord installation (e.g., port 304(a)), the LED associated with that port is turned off and the NMS is notified (for example, via a connection between the patch panel and the NMS as illustrated in FIG. 1). If the plug is plugged into the wrong port, the LED associated with the wrong port flashes red until the plug is removed. The same procedure is followed for the installation of the other plug of the patch cord.

When both plugs are connected, the jack into which the first plug was installed transmits its identification information over the ninth wire of the patch cord 312 to the jack into which the second patch cord plug was installed. This communication is preferably accomplished via an out-of-band communication on the ninth wire of a nine-wire patch cord 312. The intelligent patch panel into which the second patch cord was installed then transmits the identification information of both connected ports to the NMS.

A patch cord removal process is initiated when the system orders the removal of the patch cord and LEDs associated with the designated ports on each end of the patch cord to be removed both flash green. The plug on one end is removed and, if it is one of the designated ports, the LED associated with the port from which the plug was removed is turned off and the NMS is notified of the removal of the plug.

If a plug is removed from an incorrect port, the LED associated with the incorrect port lights solid red to indicate that the plug is to be replaced. When the plug is replaced, an identification transmission, similar to the above, is made to ensure the correct plug was installed.

When the plug at the second end of the patch cord is removed, a similar procedure is followed.

If any change in the patch cord field is made which has not been ordered, red LEDs of the jack or jacks associated with the problem will be lit solid or flashing red. The NMS will be notified and any in-process installation or removal procedure will be halted until the problem is rectified.

FIGS. 3-5 illustrate contact assemblies that may be used in some embodiments of the present invention. As shown in FIG. 3, ninth-wire panel contacts 420 and 421 (each having respective contact portions designated "a" and "b") are provided in panels 430 and 431. The panel contacts, in combination with connectivity detectors 460 and 461 and transceivers 400 and 401, allow the intelligent patch panels to detect the insertion of ninth-wire cord contacts 415 or 416 of a nine-wire patch cord 410 and to communicate necessary information between intelligent patch panels as described above. FIGS. 4-6 illustrate one embodiment of a contact assembly 520, having three contact portions 520a, 520b, and 520c installed in a panel 530. A ninth wire contact 515 of a nine-wire patch cord 510 is inserted between the contacts, thus completing a circuit and enabling the features described above. The ninth wire contact 515 may be provided with a hole or indentation 517 into which the overlapping sections of the portion 520a, 520b, and 520c may nestle. These embodiments are further shown and described in U.S. Provisional Patent Application Ser. No. 60/706,029, filed Aug. 8, 2005, entitled "Systems and Methods for Detecting a Patch Cord End Connection," which is incorporated herein by reference in its entirety.

Figure 8:
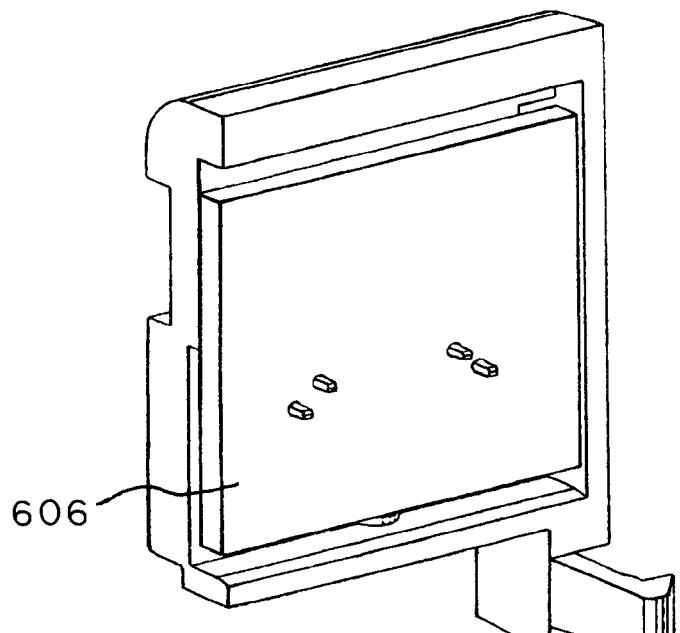
Figure 9:
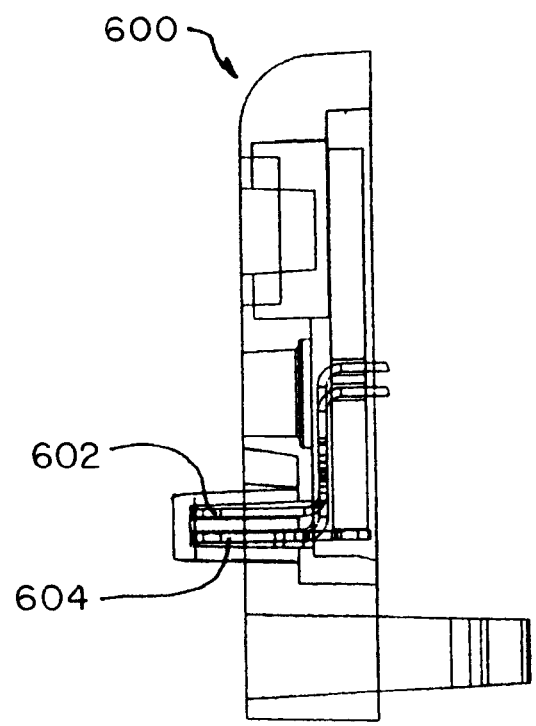
Figure 10:
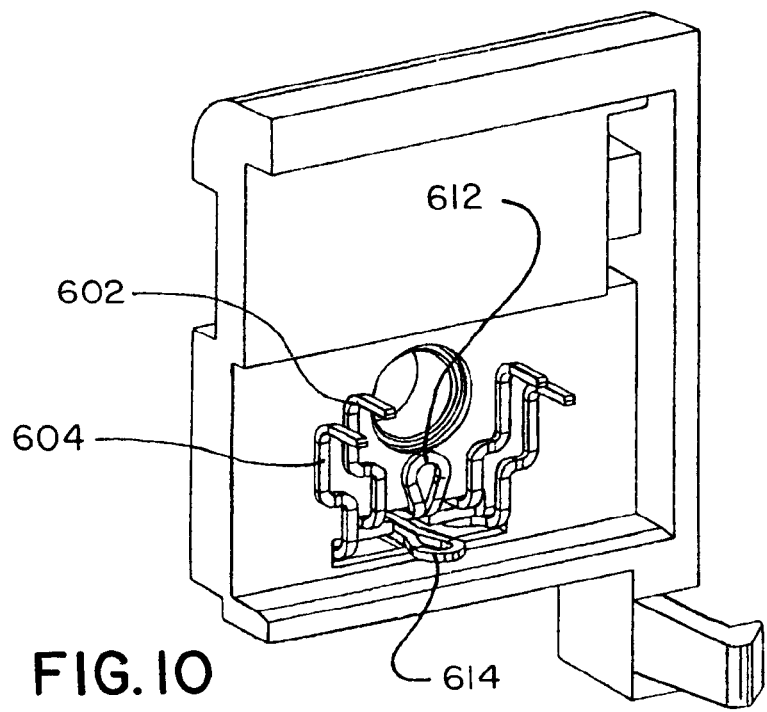
Figure 11:
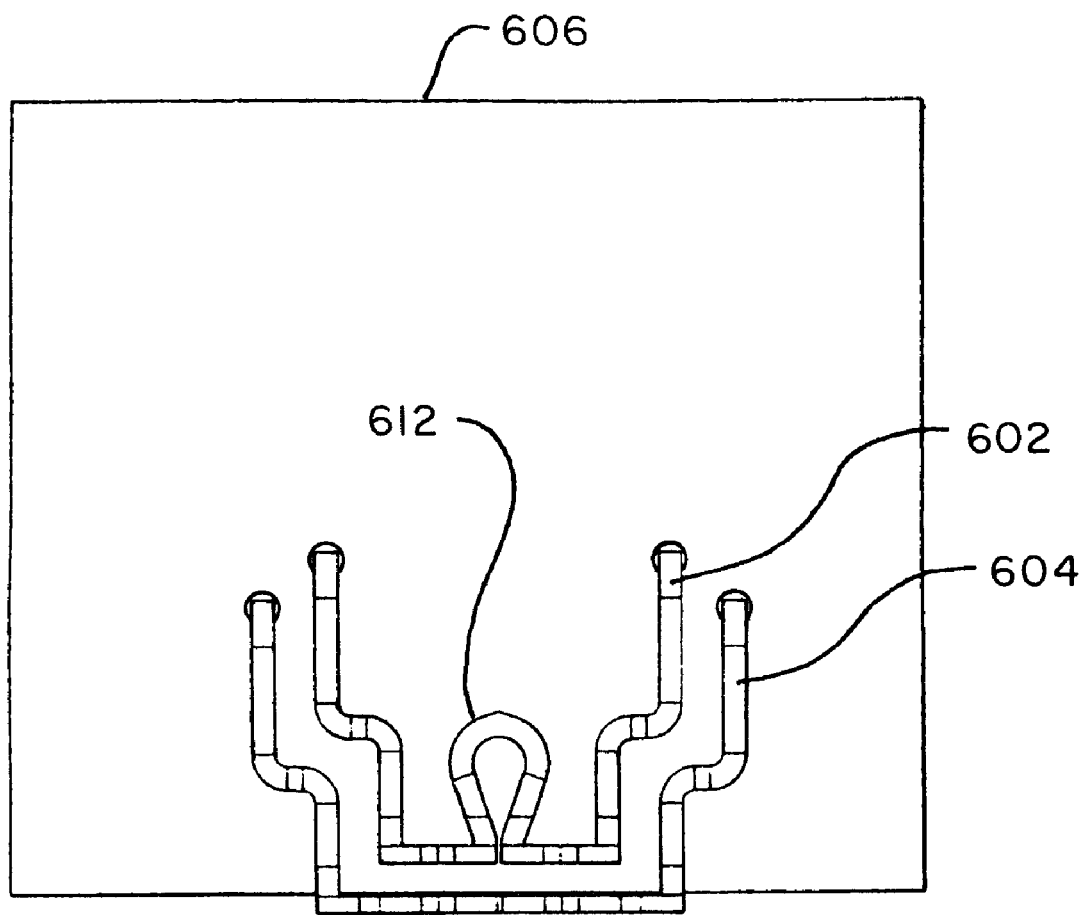
Figure 12:
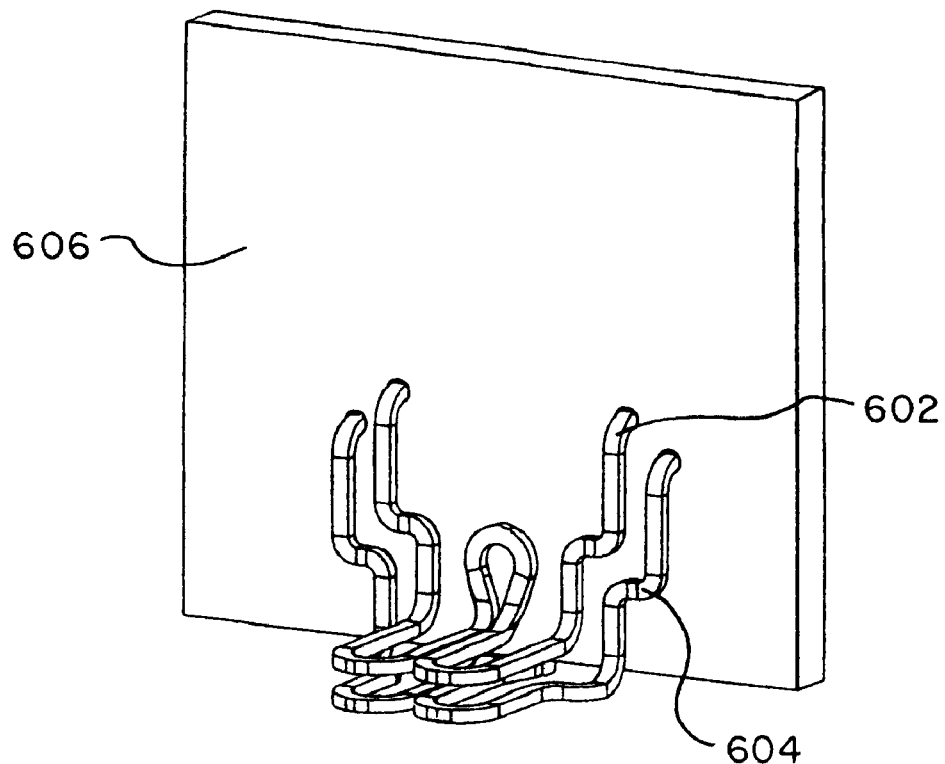
Figure 13:
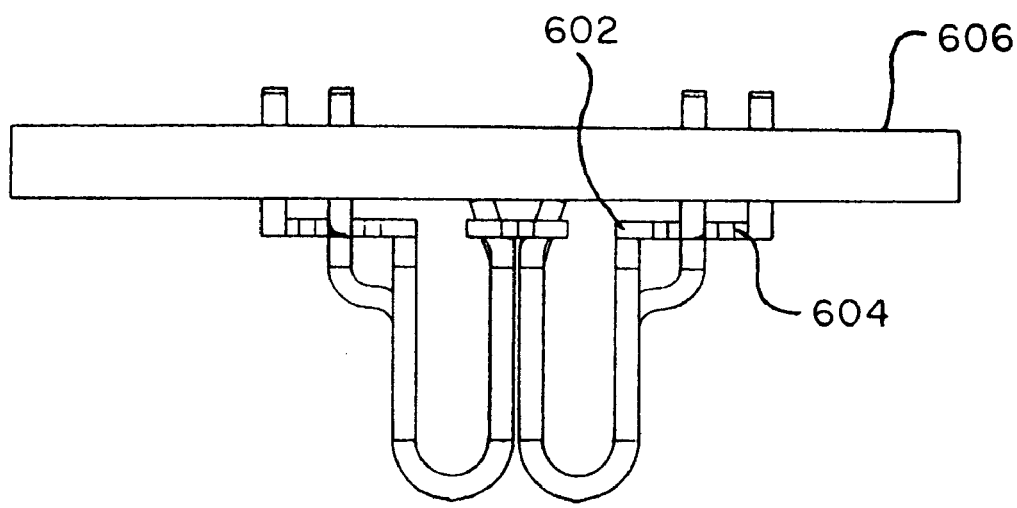
Figure 14:
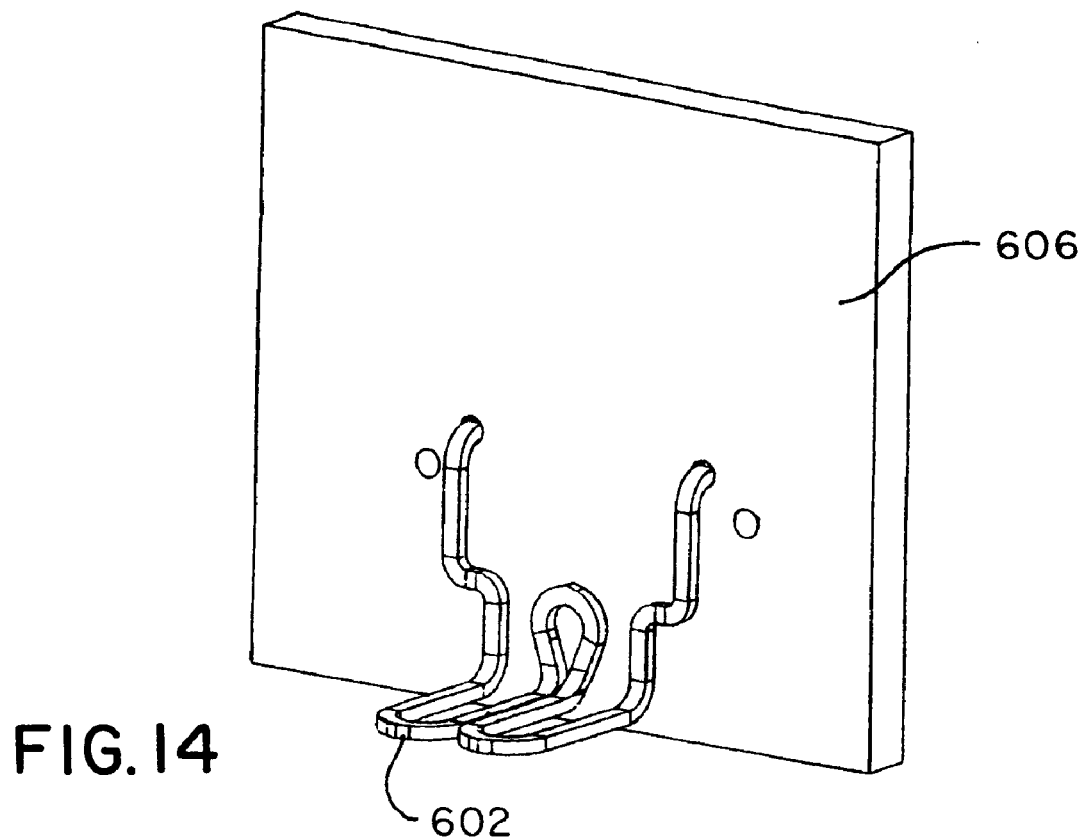
Figure 15:
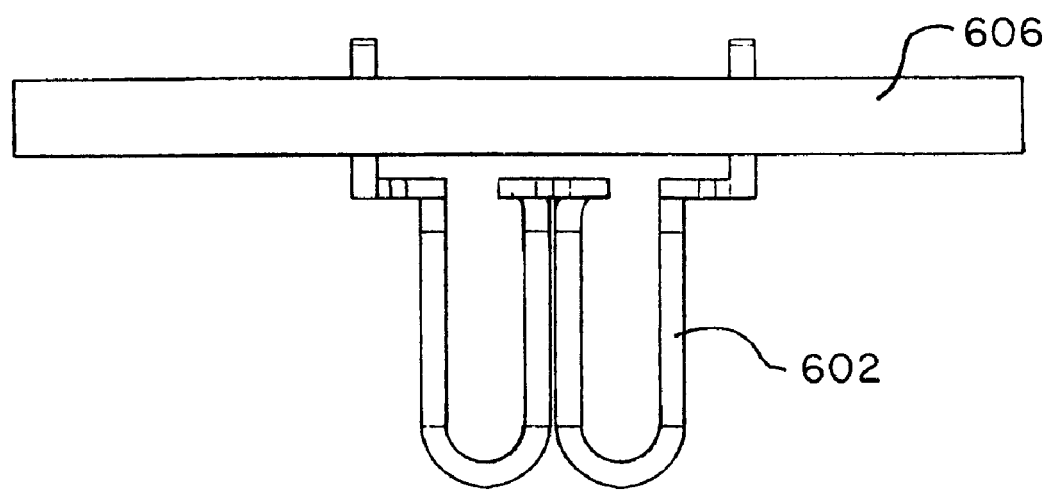
Figure 16:
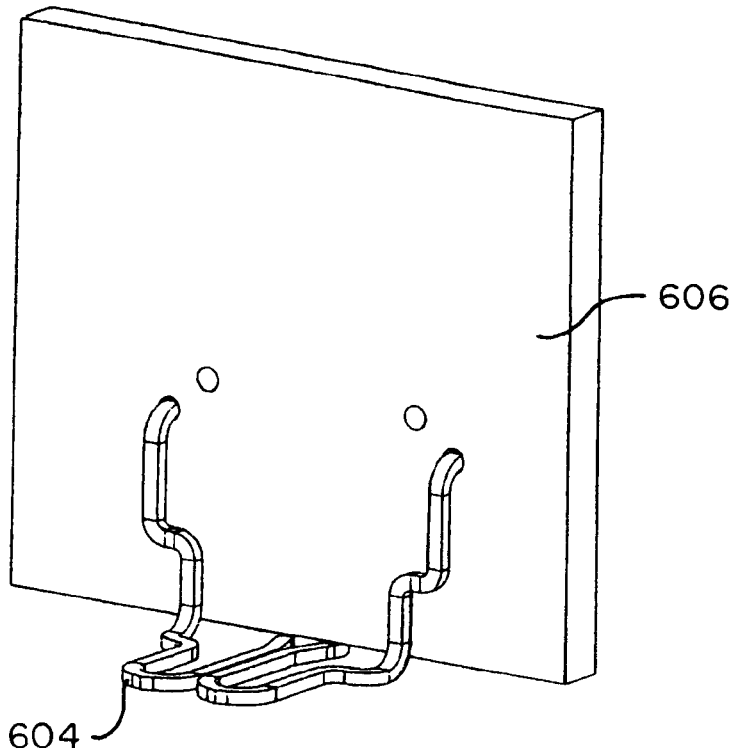
Figure 17:
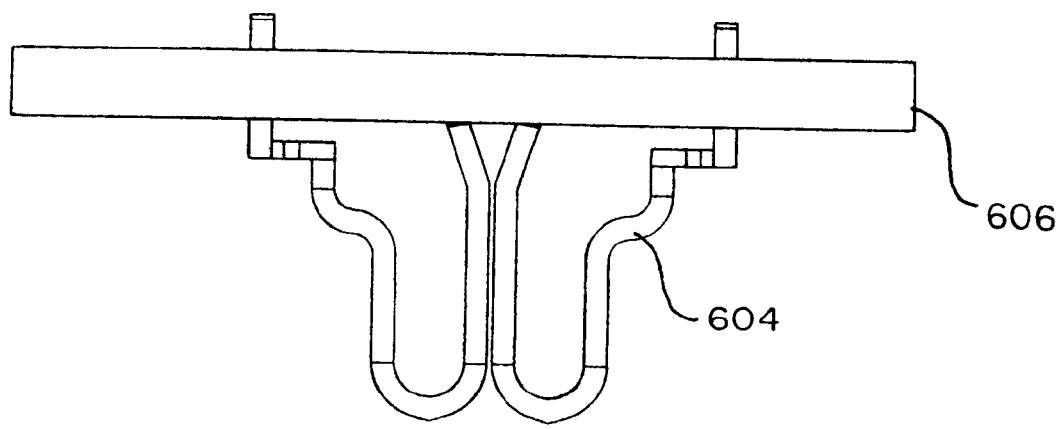

FIGS. 7-17 illustrate another embodiment of contacts that may be used in the present invention. The embodiment of FIGS. 7-17 comprises a contact area 600 that is positioned to contact ninth wire contacts of nine-wire patch cords. The contact area 600 houses upper and lower contacts 602 and 604, each of which is inserted into and makes electrical contact with a printed circuit board (PCB) as shown in FIG. 8. FIG. 8 shows a portion 606 of the PCB. As shown in FIG. 7, the assembly may be provided in an intelligent patch panel cover 610 that is provided with light-pipe openings 612 at each port position. Proper tension to ensure normal contact force between the upper and lower contacts 602 and 604 and contacts on a plug may be maintained with the use of upper and lower spring loops 612 and 614 as shown in FIG. 10.

In the embodiments shown in FIGS. 7-20, as in other embodiments, a contact such as a blade contact on the plug completes a circuit between the upper and lower contacts 602 and 604, which allows immediate detection of plug insertion. The connectivity detector circuitry may be provided on the PCB 606.

Figure 18:
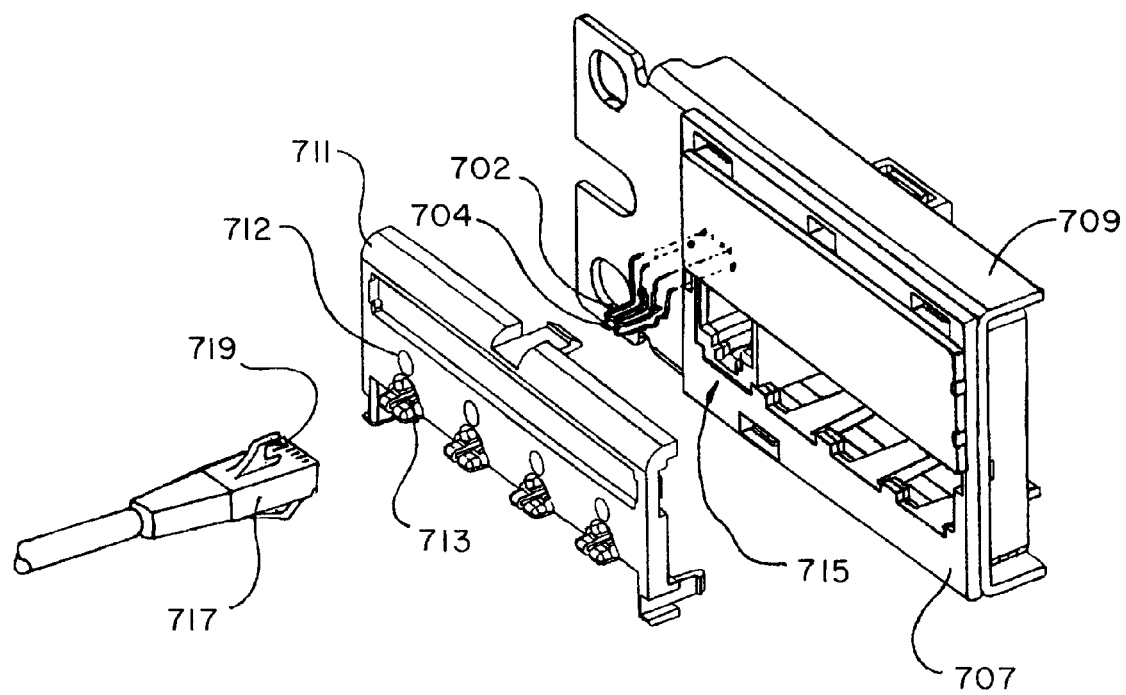
FIG. 18 is a partially exploded view of an intelligent patch panel further showing a plug for insertion into the intelligent patch panel.
Figure 19:
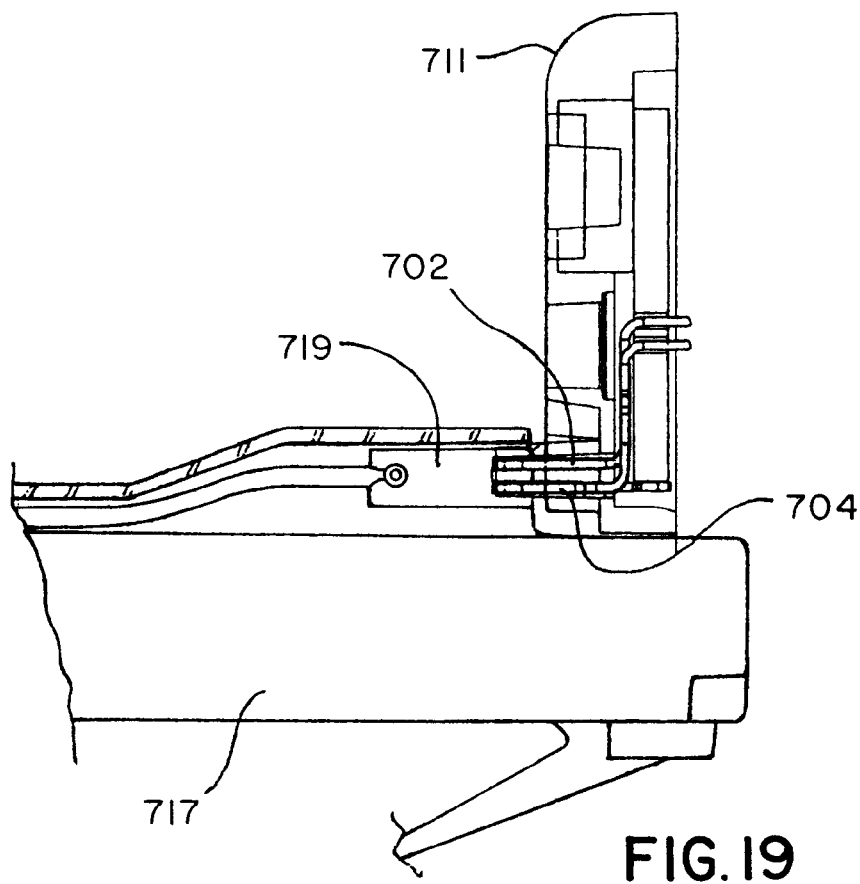
FIG. 19 is a side sectional view of a plug inserted into the intelligent patch panel.
Figure 20:
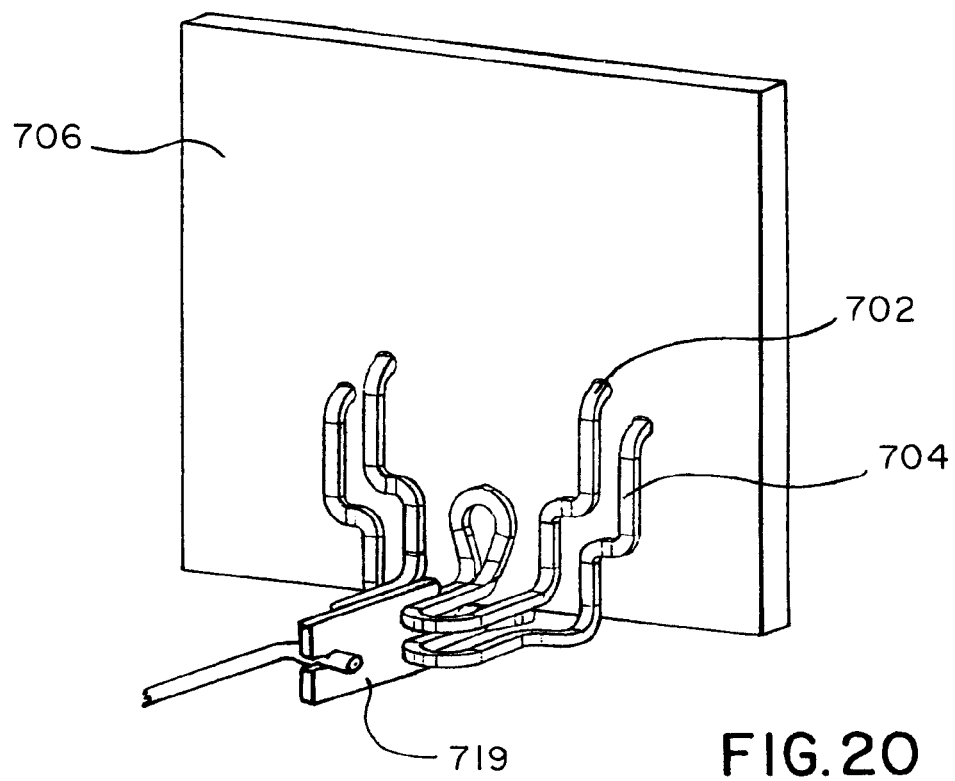
FIG. 20 is a front isometric view of the plug contact mated to the intelligent patch panel contacts.

FIG. 18 is a partially exploded view of a portion of an intelligent patch panel according to one embodiment having upper and lower contacts 702 and 704 installed therein. The contacts 702, 704 are mounted and electrically connected to the PCB 706, which is provided on a face plate 707. A section 709 of the panel (which may be a stamped metal panel) is shown. a panel cover 711 provided with light-pipe openings 712 and panel contact shrouds 713 is installed on the front face of the panel. A jack 715 is shown within the panel section 709. A plug 717 having a plug blade contact 719 is also shown.

Contacts of the type shown in FIGS. 7-20 offer a self-aligning contact interface area that can move left or right to allow panel contacts to align with plug contacts. The contact geometry and mounting location facilitate this alignment. The contacts are preferably made of pre-plated round wire which reduces or eliminates scrap, eliminates the need for stamping dies, provides good yield strength, and enables low-cost construction of the contacts. Loop dimensions of the upper and lower spring loops 612 (e.g., length and radius of the loops) can be changed to adjust contact normal force without changing the overall design of the contacts.

The principles of the present invention may be applied to other specific systems. For example, patch cords according to other embodiments of the present invention are designed for use in optical communication networks or in other electrical communication networks that do not employ RJ-45 plugs and jacks.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. An intelligent patch panel for use in a system for patch cord documentation and revision utilizing a patch cord with a ninth wire and a connector with a ninth wire pin configured for out-of-band transmissions comprising:
an opening, the opening containing a plurality of contacts configured for data communication; ninth wire contacts, the ninth wire contacts comprising upper and lower contacts, the upper and lower contacts each comprising a conductor forming two adjoining "U" shapes wherein the ninth wire pin is configured to simultaneously engage the upper and lower contacts by sliding between the adjoining "U" shapes of both the upper and lower contacts and thus completing an electrical circuit between the upper and lower contacts, the contacts being electrically isolated when the ninth wire pin is not engaged therewith.

2. The intelligent patch panel of claim 1 further comprising light pipe openings.

3. The intelligent patch panel of 2 wherein the light pipe openings and ninth wire contacts are located on a removable panel cover.

* * * * *